US012643469B2

(12) United States Patent
Peterson et al.

(10) Patent No.: US 12,643,469 B2
(45) Date of Patent: Jun. 2, 2026

(54) VEHICULAR SIDE DOOR WITH INTEGRATED BASE FOR EXTERIOR MIRROR

(71) Applicant: Magna Mirrors of America, Inc., Holland, MI (US)

(72) Inventors: Kenneth C. Peterson, Ada, MI (US); Matthew V. Steffes, Grand Rapids, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 356 days.

(21) Appl. No.: 18/466,897

(22) Filed: Sep. 14, 2023

(65) Prior Publication Data

US 2024/0092265 A1 Mar. 21, 2024

Related U.S. Application Data

(60) Provisional application No. 63/375,792, filed on Sep. 15, 2022.

(51) Int. Cl.
*B60R 1/072* (2006.01)

(52) U.S. Cl.
CPC .................................... *B60R 1/072* (2013.01)

(58) Field of Classification Search
None
See application file for complete search history.

(56) References Cited

U.S. PATENT DOCUMENTS

| | | | |
|---|---|---|---|
| 4,605,260 A * | 8/1986 | Sakakibara ................ | B60J 1/14 49/374 |
| 4,826,289 A | 5/1989 | Vandenbrink et al. | |
| 4,956,941 A * | 9/1990 | Vaughan .................. | B60J 10/75 49/440 |
| 5,150,941 A * | 9/1992 | Silzer ..................... | B60J 1/2002 296/180.1 |
| 6,213,609 B1 * | 4/2001 | Foote ...................... | B60R 1/078 359/881 |
| 6,439,755 B1 | 8/2002 | Fant, Jr. et al. | |
| 6,501,387 B2 | 12/2002 | Skiver et al. | |
| 7,184,190 B2 | 2/2007 | McCabe et al. | |
| 7,249,860 B2 | 7/2007 | Kulas et al. | |
| 7,255,451 B2 | 8/2007 | McCabe et al. | |
| 7,274,501 B2 | 9/2007 | McCabe et al. | |
| 7,289,037 B2 | 10/2007 | Uken et al. | |
| 7,338,177 B2 | 3/2008 | Lynam | |
| 7,360,932 B2 | 4/2008 | Uken et al. | |

(Continued)

*Primary Examiner* — Ryan Crockett
(74) *Attorney, Agent, or Firm* — HONIGMAN LLP

(57) ABSTRACT

A vehicular exterior rearview mirror system includes a vehicle door having an inner sheet metal portion and an outer sheet metal portion. A base bracket includes (i) a body portion, (ii) a mirror mounting portion that extends from the body portion and (iii) an attaching portion that extends from the body portion. The attaching portion is attached at the inner sheet metal portion of the vehicle door. The body portion of the base bracket is partially disposed at an interior portion of the vehicle door between the inner sheet metal portion and the outer sheet metal portion. The mirror mounting portion extends outboard of the outer sheet metal portion from the body portion. A mirror head is attached at the mirror mounting portion of the base bracket. The mirror head includes a mirror reflective element.

15 Claims, 6 Drawing Sheets

(56)  References Cited

U.S. PATENT DOCUMENTS

| | | |
|---|---|---|
| 7,626,749 B2 | 12/2009 | Baur et al. |
| 8,049,640 B2 | 11/2011 | Uken et al. |
| 8,277,059 B2 | 10/2012 | McCabe et al. |
| 8,529,108 B2 | 9/2013 | Uken et al. |
| 8,915,601 B2 | 12/2014 | Foote et al. |
| 9,346,403 B2 | 5/2016 | Uken et al. |
| 9,487,142 B2 | 11/2016 | Sobecki et al. |
| 9,827,913 B2 | 11/2017 | De Wind et al. |
| 10,046,706 B2 | 8/2018 | Larson et al. |
| 10,099,618 B2 | 10/2018 | Foote et al. |
| 10,442,360 B2 | 10/2019 | LaCross et al. |
| 11,242,008 B2 | 2/2022 | Blank et al. |
| 2006/0050018 A1 | 3/2006 | Hutzel et al. |
| 2006/0061008 A1 | 3/2006 | Karner et al. |
| 2010/0064592 A1* | 3/2010 | Ohe ......................... B60R 1/06 |
| | | 296/1.11 |

| | | |
|---|---|---|
| 2010/0088855 A1* | 4/2010 | Ruse ....................... E05B 77/06 |
| | | 16/412 |
| 2011/0148575 A1* | 6/2011 | Sobecki .................. E05B 5/006 |
| | | 292/336.3 |
| 2013/0127205 A1* | 5/2013 | Jaynes ................... B62D 33/06 |
| | | 296/190.08 |
| 2014/0285666 A1* | 9/2014 | O'Connell ............... B60R 1/28 |
| | | 348/148 |
| 2018/0134217 A1* | 5/2018 | Peterson ................ G08G 1/167 |
| 2020/0223364 A1 | 7/2020 | Peterson et al. |
| 2020/0353867 A1 | 11/2020 | Huizen et al. |
| 2021/0155167 A1 | 5/2021 | Lynam et al. |
| 2021/0162926 A1 | 6/2021 | Lu |
| 2021/0213880 A1 | 7/2021 | Esser |
| 2021/0245662 A1 | 8/2021 | Blank et al. |
| 2021/0316664 A1 | 10/2021 | Baur |
| 2021/0331625 A1 | 10/2021 | Huizen et al. |
| 2024/0064274 A1 | 2/2024 | Blank et al. |

* cited by examiner

VEHICULAR SIDE DOOR WITH INTEGRATED BASE FOR EXTERIOR MIRROR

CROSS REFERENCE TO RELATED APPLICATION

The present application claims the filing benefits of U.S. provisional application Ser. No. 63/375,792, filed Sep. 15, 2022, which is hereby incorporated herein by reference in its entirety.

FIELD OF THE INVENTION

The present invention relates generally to the field of rearview mirror assemblies for vehicles.

BACKGROUND OF THE INVENTION

It is known to provide an automotive rearview mirror assembly that includes one or more accessories, such as a light source and/or a user input or the like. The mirror reflective element of such known mirror assemblies include a mirror reflector coating that is vacuum deposited or sputter coated onto a surface of a glass substrate of the mirror reflective element and preferably includes visual indicators such as turn signal indicators and blind zone indicators that indicate to a driver presence of another overtaking vehicle in a side lane adjacent to the equipped vehicle.

SUMMARY OF THE INVENTION

A vehicular exterior rearview mirror system for a vehicle includes a vehicle door having an inner sheet metal component and an outer sheet metal component, and a base bracket fixedly attached at the inner sheet metal component of the vehicle door. The base bracket is at least partially encased at the door via the outer sheet metal component, with a mounting portion extending outboard from the outer sheet metal component. A mirror head comprises a mirror reflective element. The mirror head is attached at the mounting portion of the base bracket.

These and other objects, advantages, purposes and features of the present invention will become apparent upon review of the following specification in conjunction with the drawings.

DESCRIPTION OF THE PREFERRED EMBODIMENTS

Figure 1:
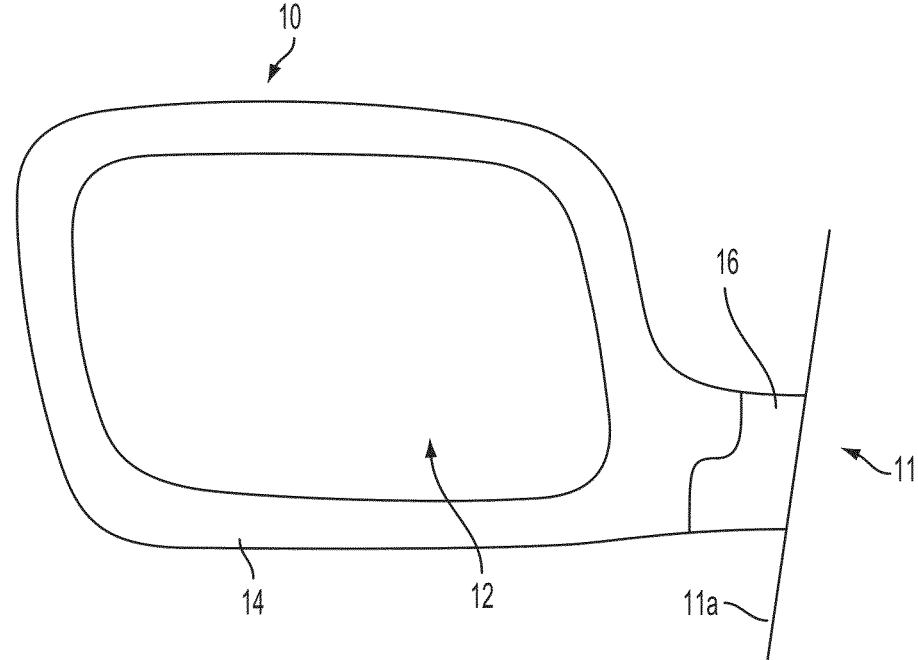
FIG. 1 is a view of an exterior rearview mirror assembly.

Referring now to the drawings and the illustrative embodiments depicted therein, an exterior rearview mirror assembly 10 for a vehicle 11 includes a mirror reflective element 12 received in and/or supported at or by a mirror head 14 (FIG. 1). The mirror head 14 may be fixedly attached at a mounting arm or base 16 integrated into or at the side 11a of the vehicle 11 or may be movably mounted to a mounting arm or base or portion 16, and may comprise a breakaway mirror (where the mirror head portion may be manually pivoted about the mounting arm or base) or may comprise a powerfold mirror (where the mirror head portion may be pivoted via an actuator assembly or adjustment device). The mounting arm or base 16 of the mirror assembly 10 is integrated at least partially within the side 11a of a host or subject vehicle 11, with the reflective element 12 providing a rearward field of view along the respective side of the vehicle to the driver of the vehicle.

Referring to FIGS. 2-8, the mirror assembly 10 may be mounted at a door 18 of the vehicle 11, such as a front passenger-side door or a front driver-side door of the vehicle. The door 18 includes a first or inner portion or sheet metal panel 18a and a second or outer portion or sheet metal panel 18b, where the inner panel 18a and the outer panel 18b are joined together, such as to accommodate electronic components, a window assembly, a door latch mechanism, and the like at an interior portion of the door 18. The outer panel 18b may include an aperture or cutout portion 20 and the mounting arm 16 is attached at the inner panel 18a so as to extend through or past the cutout portion 20 and be accessible at an outer side of the door 18. Optionally, the mounting base 16 may be integrally formed with the inner panel 18a, such as via a common casting or stamping process.

Figures 4, 5:
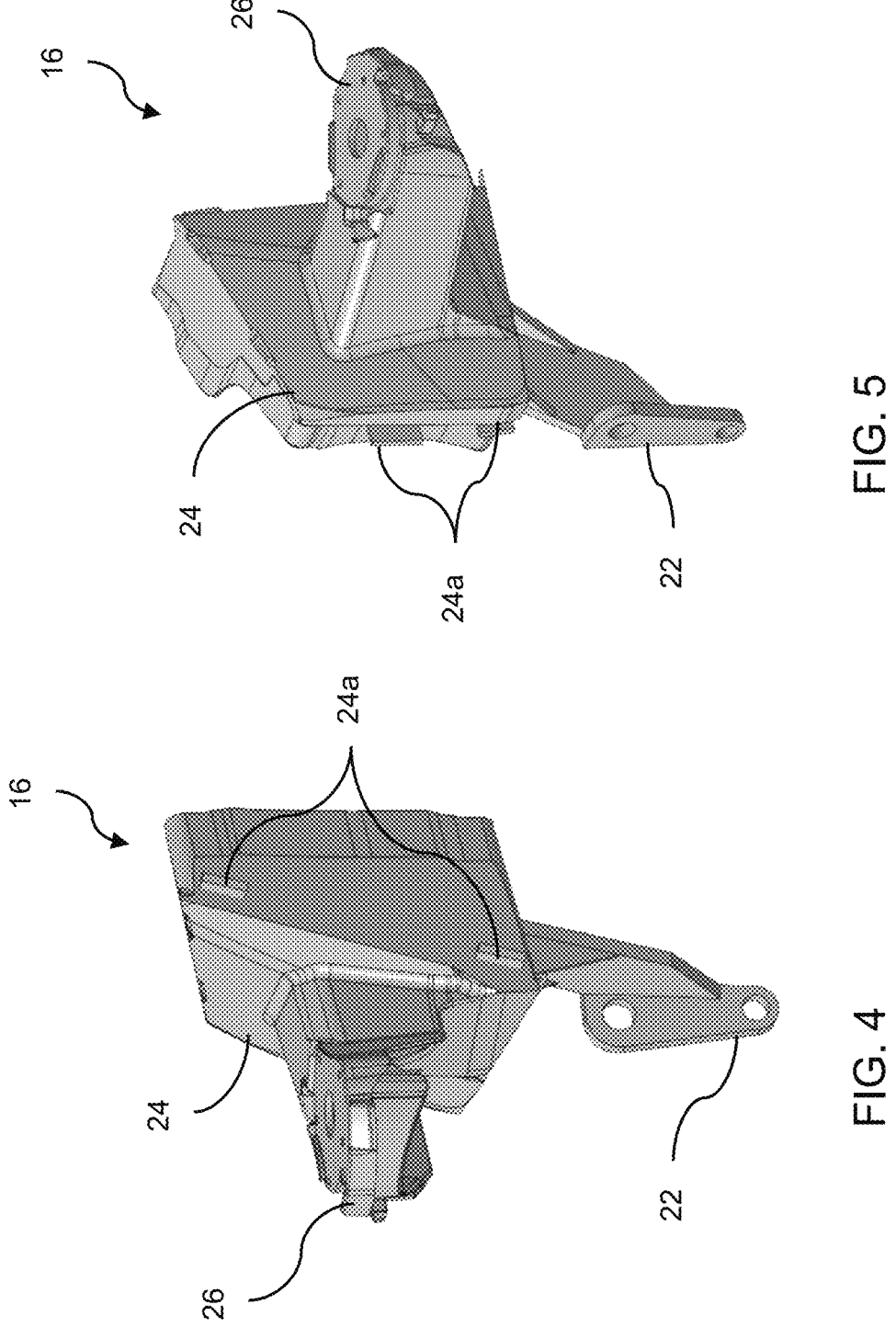
FIGS. 4 and 5 are perspective views of the integrated base bracket.

In the illustrated example of FIGS. 4 and 5, the mounting base 16 may include an attachment portion 22 that mounts the mounting base 16 at a mounting region of the inner panel 18a, such as via one or more threaded fasteners that extend through the attachment portion 22 and at least partially through the inner panel 18a to secure the mounting base 16 at the door 18. The attachment portion 22 may attach the mounting base 16 at a region of the inner panel 18a that corresponds to the hinge of the door 18.

The attachment portion 22 may extend from a body or bracket portion 24 of the mounting base 16 that is configured to position or locate the mounting base 16 within the door 18. For example, the bracket portion 24 may be sized and/or shaped to correspond to a receiving portion of the cavity between the inner panel 18a and the outer panel 18b. With the bracket portion 24 positioned at the receiving portion, the attachment portion 22 is disposed at or near the mounting region of the inner panel 18a.

Figure 6:
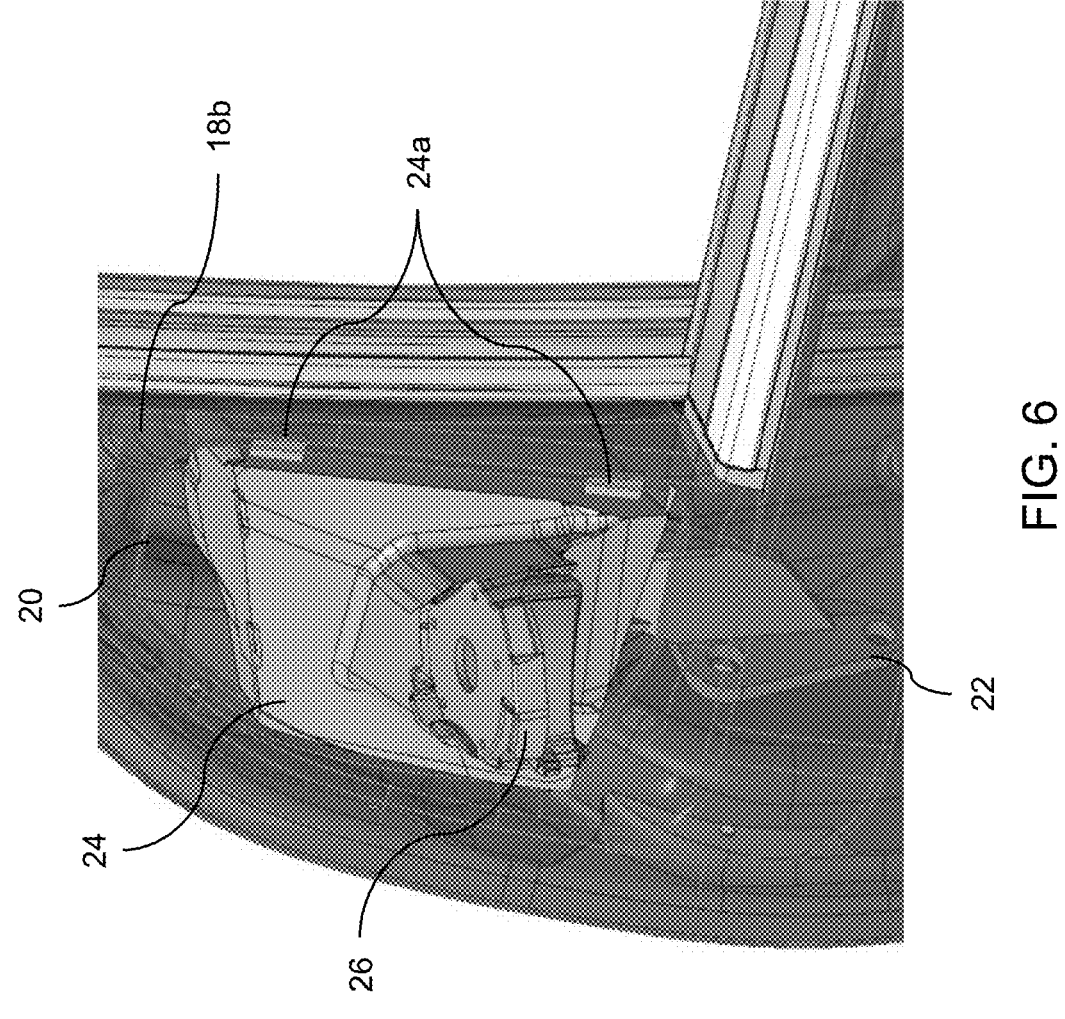
FIG. 6 is a perspective view of the integrated bracket attached at the door.

Further, one or more tabs 24a may extend from the bracket portion 24 so as to be at least partially received between the inner panel 18a and the outer panel 18b during assembly of the door 18. That is, with the mounting base 16 disposed at the inner panel 18a, the tabs 24a may be received or compressed between respective portions of the inner panel 18a and the outer panel 18b when the panels are joined together to secure the mounting base within the door 18. For example, the bracket portion 24 may be at least partially aligned with or disposed behind the cutout region 20 of the outer panel 18b and the tabs 24a may engage an inner surface of the outer panel 18b that circumscribes the cutout region 20 to preclude the bracket portion 24 from moving through or falling out of the cutout region 20 (FIG. 6).

With the mounting base 16 attached or mounted at the inner panel 18a and with the outer panel 18b joined to the inner panel 18a, an arm portion 26 extends from the bracket portion 24 and through or past the cutout region 20 of the outer panel 18b to be exposed at the exterior of the vehicle door 18. The mirror head 14 pivotally attaches at the arm portion 26 and, with the door 18 mounted at the vehicle, is pivotable at least between an extended or use position (where the mirror head 14 is extended from the side of the vehicle and the mirror reflective element 12 provides the rearward field of view along the side of the vehicle to the driver) and a folded or non-use position (where the mirror head 14 is folded from the extended position inward toward the side of the vehicle). The mirror head 14 may fold forward from the extended position and away from the folded position to a forward fold position, such as responsive to an impact at the mirror head 14.

Figure 7:
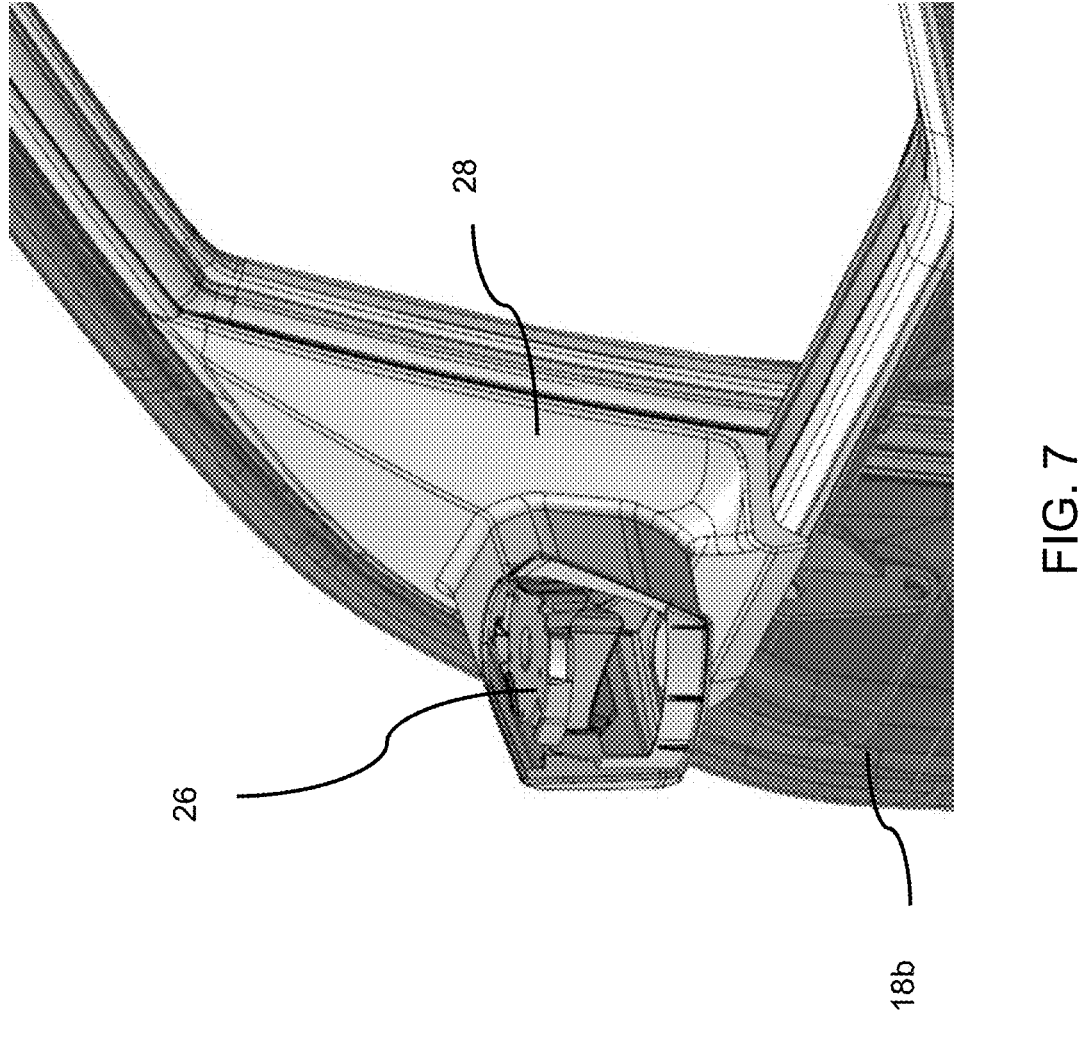
FIG. 7 is a perspective view of the door, shown with a base cover attached at the door and partially covering the bracket.

As shown in FIG. 7, a cover or housing 28 may attach at the outer panel 18b of the door 18 and at least partially cover or conceal the cutout portion 20 and the mounting base 16. For example, the cover 28 may snap attach at the outer panel 18b, such as via clips or fasteners attaching to a lip or ridge circumscribing the cutout portion 20. Optionally, the cover 28 may attach to the outer panel 18b in any suitable manner, such as via threaded fasteners, adhesive attachment, and the like. An outer surface of the cover 28 may be substantially flush with an outer surface of the outer panel 18b at or near the aperture 20 and the mirror assembly. The cover 28 extends partially along the arm portion 26, with at least a portion of the arm 26 exposed for attachment to the mirror head.

Figure 8:
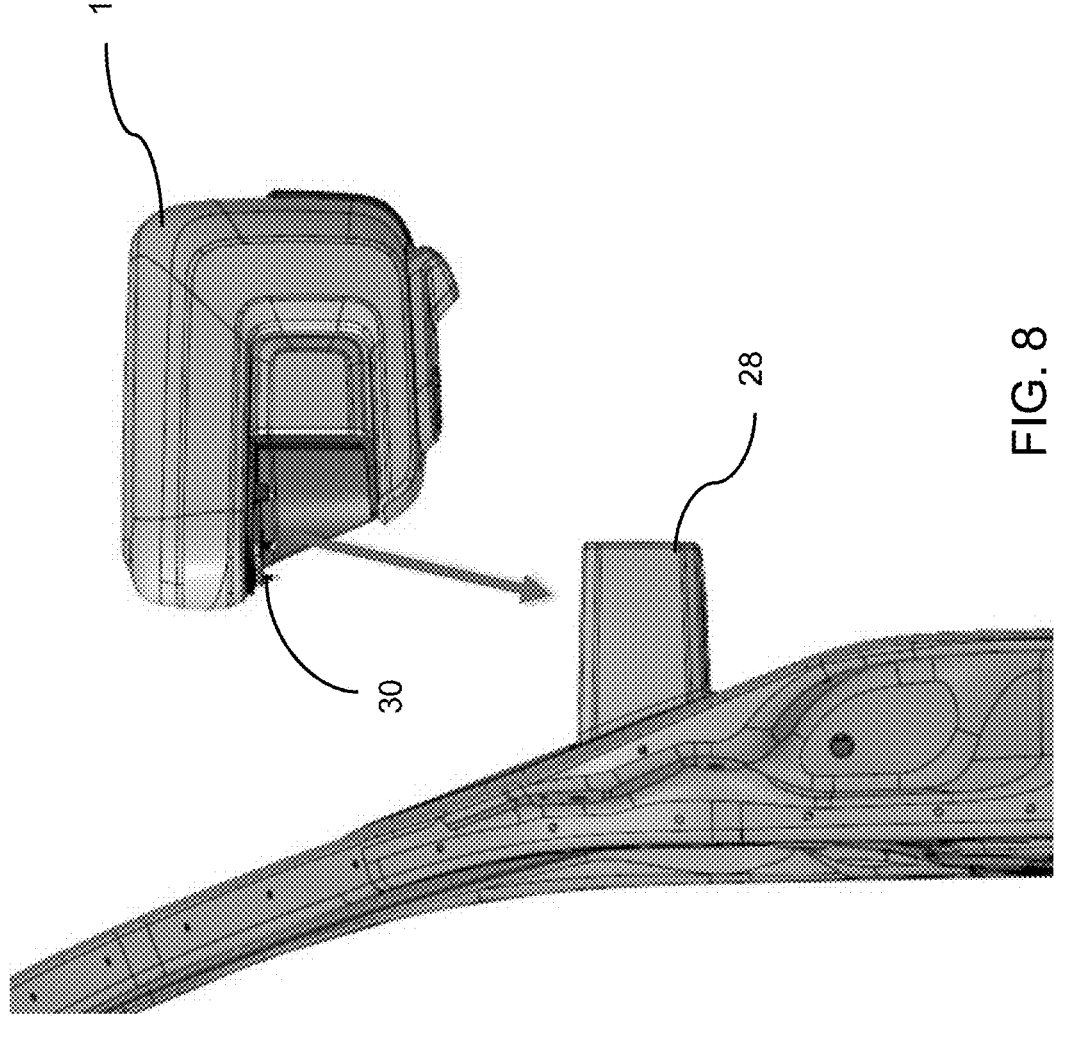
FIG. 8 is a view of the mounting portion of the bracket extending from the door so as to be ready for attaching a mirror head at the bracket.

With the cover 28 attached at the outer panel 18b, the mirror head 14 pivotally attaches at the arm portion 26 of the mounting base 16 (FIG. 8). For example, the mounting configuration between the mirror head 14 and the arm portion 26 may comprise a bayonet mount, where one or more protrusions or pins 30 at the mirror head 14 are received along or within corresponding slots at the arm portion 26 and the mirror head 14 is rotated or slid relative to the arm portion 26 to secure the mirror head 14 at the mounting base 16.

The mirror head 14 may include a recess or receiving portion at which the mirror head attaches to the mounting base 16. Thus, with the mirror head 14 attached at the arm portion 26, the exterior surface of the cover 28 and an outer surface of the mirror head 14 may substantially correspond to one another to provide a smooth transition or appearance between the door 18, the cover 28 and the mirror head 14. The cover 28 and the mirror head 14 may cooperate to conceal or hide the mounting base 16. Electrical wiring may extend from within the door 18 and along the arm portion 26 to electrically connect electrical components at the mirror head 14 to the wiring harness of the vehicle.

For example, an electrically powered mirror actuator may be disposed at the arm portion 26 and electrically operable to move the mirror head 14 between the extended and folded positions. The powerfold actuator may pivotally attach the mirror head 14 at the mounting base 16. Optionally, the mirror head 14 pivotally attaches at the mounting base 16 via a pivot point that allows for manual pivoting of the mirror head between the extended and folded positions.

With the mounting base 16 integrated with the door assembly and the cover 28 and mirror head 14 mounted at the outer panel 18b of the door 18, and with the electrical connectors for the mirror head 14 extending along the mounting base 16 behind the cover 28 and within the door 18, the door 18 may be provided as a completed assembly for mounting at the vehicle. This may allow for simpler and faster assembly of the door at the vehicle.

Thus, the system may integrate the entire door assembly into a module which is shipped to an OEM for assembly to the vehicle. The inner base of the folding mirror is integrated into door structure (sheet metal or casting integrated into door), as shown in FIGS. 2-8. The mirror head is mounted to the door at the folding pivot point. A bayonet mount of a power fold actuator to the door may be implemented to limit or eliminate the need for tools. The system provides for elimination of an outer base component and simplified styling. Cost and weight savings may be achieved due to eliminated components, reduced redundancy and simplified assembly. The integrated base may be applied to camera monitoring system (CMS) applications, where a screen and wing mount is integrated into door for easier wire routing. This facilitates system-level product manufacturing, testing, and delivery to the OEM.

Figure 3:
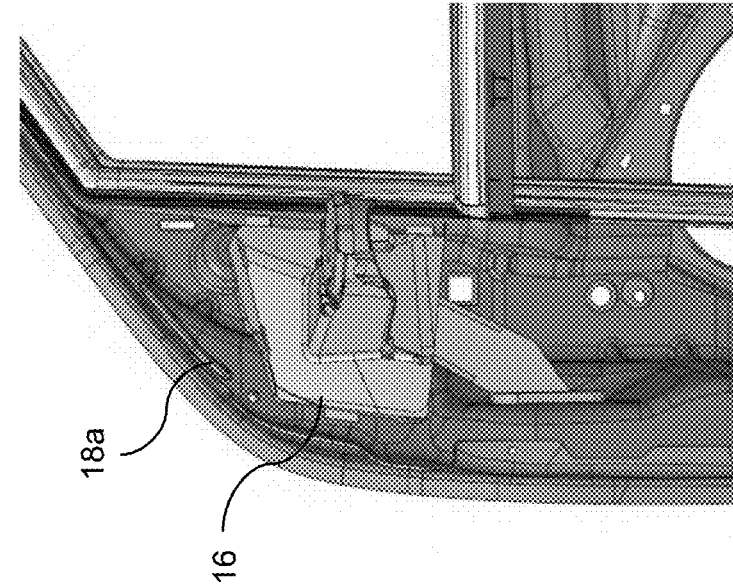
FIG. 3 is a side view of the vehicle door of FIG. 2, with an outer sheet metal component removed from an inner sheet metal component to show the integrated base bracket fixedly attached at the inner sheet metal component.
Figure 3:
Figure 2:
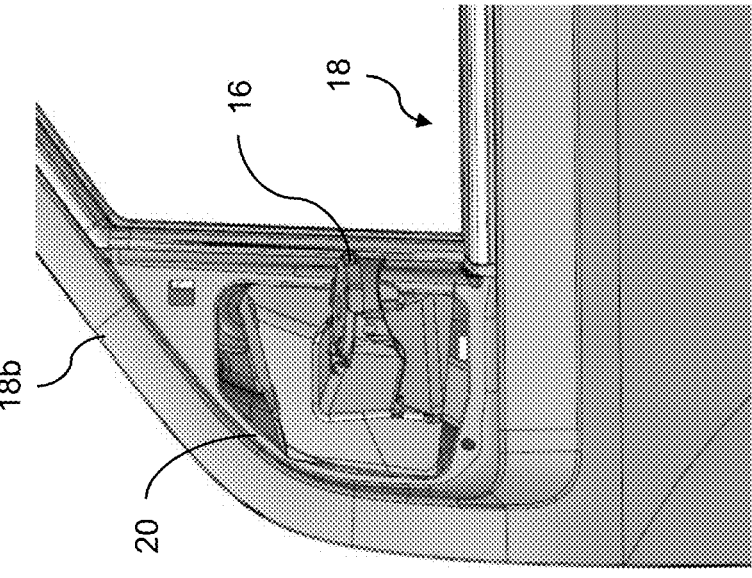
FIG. 2 is a side view of a vehicle door having an integrated base bracket for the exterior rearview mirror assembly to be attached thereat.

As shown in FIGS. 2 and 3, the integrated base bracket 16 may be attached to the inner door sheet metal component 18a, with the outer door sheet metal component 18b forming the door and at least partially encasing the integrated base bracket 16 at the door. As shown in FIGS. 4 and 5, the integrated base bracket structure 16 comprises mounting portions 22 for bolting or fastening to the door (such as to the inner door sheet metal) and has the support arm 26 that extends outward and provides an attachment portion at which the mirror head 14 attaches (such as pivotally attaches, such as via a breakaway joint or a powerfold actuator). As shown in FIG. 6, the bracket 16 includes tab features 24 for encapsulating the base bracket 16 between the inner and outer sheet metal components. The base bracket 16 may attach to the door hinge. The base cover 28 (FIG. 7) is snapped on overtop of the base bracket structure 16, leaving the pivot or pivot mount at the end of the support arm 26 exposed or open for assembly of the mirror head 14 to the bracket 16. FIG. 8 shows the mirror head assembly 14 being positioned for attachment to the pivot mount of the integrated base bracket 16.

The mirror assembly may utilize aspects of the mirror assemblies described in U.S. Publication Nos. US-2021-0331625; US-2021-0316664; US-2021-0213880; US-2020-0353867 and/or US-2020-0223364, and/or U.S. Pat. Nos. 10,099,618; 9,827,913; 9,487,142; 9,346,403 and/or 8,915,601, which are all hereby incorporated herein by reference in their entireties.

Optionally, the exterior mirror element of the mirror assembly may include heater pad or film or element at a rear surface of the mirror reflective element. The heater pad or element at the rear surface of the glass substrate may comprise a mirror defrost/demisting heater and may provide an anti-fogging of de-fogging feature to the exterior mirror assembly, and may utilize aspects of the heater elements or pads described in U.S. Pat. Nos. 9,481,304; 8,058,977; 7,400,435; 5,808,777; 5,610,756 and/or 5,446,576, and/or U.S. Pat. Publication No. US-2008-0011733, which are hereby incorporated herein by reference in their entireties. The heater element may include electrical contacts that extend rearward therefrom and through an aperture of attaching portion of back plate for electrical connection to a wire harness or connector of the mirror assembly, or the back plate and/or heater pad may include suitable electrical connectors and connections incorporated therein (such as by utilizing aspects of the mirror assembly described in U.S. Pat. No. 7,400,435, which is hereby incorporated herein by reference in its entirety) for electrically connecting the heater pad (or other suitable electrical connectors may be utilized, such as electrical leads or wire harnesses or pigtails or other separate connectors or cables or the like). Optionally, the heater pad may comprise a screen printed heater pad. For example, the heater pad can be printed on the back of the mirror reflective element (such as at the fourth or rear surface of the rear substrate). Such coatings may be printed and then cured at around 120 degrees C. or lower, making this process compatible with already formed laminate type EC mirror elements, such as those described in U.S. Pat. No. 5,724,187, which is hereby incorporated herein by reference in its entirety.

The mirror assembly may comprise any suitable construction, such as, for example, a mirror assembly with the reflective element being nested in the mirror casing and with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/ or 8,529,108, or such as a mirror assembly having a rear substrate of an electro-optic or electrochromic reflective element or non-electro-optic reflective element nested in the mirror casing, and with the front substrate having curved or beveled perimeter edges, such as by utilizing aspects of the mirror reflective elements described in U.S. Pat. Nos. 10,099,618; 9,827,913; 9,598,016; 9,346,403; 9,174,578; 8,915,601; 8,730,553 and/or 8,508,831, which are hereby incorporated herein by reference in their entireties (and with electrochromic and prismatic mirrors of such construction are commercially available from the assignee of this application under the trade name INFINITY™ mirror).

Optionally, the mirror assembly may include a blind spot indicator and/or a turn signal indicator, such as an indicator or indicators of the types described in U.S. Pat. Nos. 8,242,896; 7,492,281; 6,198,409; 5,929,786 and/or 5,786, 772, which are hereby incorporated herein by reference in their entireties. The signal indicator or indication module may include or utilize aspects of various light modules or systems or devices, such as the types described in U.S. Pat. Nos. 8,764,256; 7,626,749; 7,581,859; 6,227,689; 6,582, 109; 5,371,659; 5,497,306; 5,669,699; 5,823,654; 6,176,602 and/or 6,276,821, and/or U.S. Publication No. US-2013- 0242586, which are all hereby incorporated herein by reference in their entireties.

The mirror assembly may comprise or utilize aspects of other types of casings or the like, such as described in U.S. Pat. Nos. 7,338,177; 7,289,037; 7,249,860; 6,439,755; 4,826,289 and 6,501,387, which are all hereby incorporated herein by reference in their entireties, without affecting the scope of the present invention. For example, the mirror assembly may utilize aspects of the flush or frameless or bezelless reflective elements described in U.S. Pat. Nos. 7,626,749; 7,360,932; 7,289,037; 7,255,451; 7,274,501 and/ or 7,184,190, and/or in U.S. Publication Nos. US-2006- 0061008 and/or US-2006-0050018, which are all hereby incorporated herein by reference in their entireties.

Optionally, a camera monitoring system (CMS) of the vehicle incorporates multiple inputs, such as from the inward viewing or driver monitoring camera and from the forward or outward viewing camera, as well as from a rearward viewing camera and sideward viewing cameras of the CMS, to provide the driver with unique collision mitigation capabilities based on full vehicle environment and driver awareness state. The image processing and detections and determinations are performed locally within the interior rearview mirror assembly and/or the overhead console region, depending on available space and electrical connections for the particular vehicle application. The CMS cameras and system may utilize aspects of the systems described in U.S. Pat. No. 11,242,008 and/or U.S. Publication Nos. US-2021-0162926; US-2021-0155167; US-2018-0134217 and/or US-2014-0285666, and/or International PCT Publication No. WO 2022/150826, 2022, which are all hereby incorporated herein by reference in their entireties.

The ECU may receive image data captured by a plurality of cameras of the vehicle, such as by a plurality of surround view system (SVS) cameras and a plurality of camera monitoring system (CMS) cameras and optionally one or more driver monitoring system (DMS) cameras. The ECU may comprise a central or single ECU that processes image data captured by the cameras for a plurality of driving assist functions and may provide display of different video images to a video display screen in the vehicle (such as at an interior rearview mirror assembly or at a central console or the like) for viewing by a driver of the vehicle. The system may utilize aspects of the systems described in U.S. Pat. Nos. 10,442,360 and/or 10,046,706, and/or U.S. Publication Nos. US-2021-0245662; US-2021-0162926; US-2021-0155167 and/or US-2019-0118717, and/or International PCT Publication No. WO 2022/150826, which are all hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A vehicular exterior rearview mirror system, the vehicular exterior rearview mirror system comprising:

a vehicle door having an inner sheet metal portion and an outer sheet metal portion;

a base bracket comprising (i) a body portion, (ii) a mirror mounting portion that extends from the body portion and (iii) an attaching portion that extends from the body portion;

wherein the attaching portion is attached at the inner sheet metal portion of the vehicle door;

wherein the body portion of the base bracket is partially disposed at an interior portion of the vehicle door between the inner sheet metal portion and the outer sheet metal portion, and wherein the mirror mounting portion extends outboard of the outer sheet metal portion from the body portion;

a mirror head comprising a mirror reflective element, wherein the mirror head is attached at the mirror mounting portion of the base bracket;

wherein the outer sheet metal portion comprises a cutout region, and wherein the mirror mounting portion of the base bracket extends through the cutout region and outboard from the outer sheet metal portion; and wherein the base bracket comprises a tab extending from the body portion of the base bracket, and wherein the tab engages a surface of the outer sheet metal portion at or near the cutout region.

2. The vehicular exterior rearview mirror system of claim 1, wherein the mirror head is attached at the mirror mounting portion of the base bracket via a pivot joint.

3. The vehicular exterior rearview mirror system of claim 1, further comprising a powerfold actuator that is operable to pivot the mirror head relative to the mirror mounting portion of the base bracket.

4. The vehicular exterior rearview mirror system of claim 1, wherein the tab is disposed between and contacts the surface of the outer sheet metal portion and a surface of the inner sheet metal portion.

5. The vehicular exterior rearview mirror system of claim 1, wherein a cover portion extends from the outer sheet metal portion and at least partially along the mirror mounting portion of the base bracket.

6. The vehicular exterior rearview mirror system of claim 5, wherein the cover portion snap attaches at the outer sheet metal portion.

7. The vehicular exterior rearview mirror system of claim 1, wherein the vehicle door is configured for mounting at a side of a vehicle equipped with the vehicular exterior rearview mirror system.

8. A vehicular exterior rearview mirror system, the vehicular exterior rearview mirror system comprising:

a vehicle door having an inner sheet metal portion and an outer sheet metal portion;

a base bracket comprising (i) a body portion, (ii) a mirror mounting portion that extends from the body portion and (iii) an attaching portion that extends from the body portion;

wherein the attaching portion is attached at the inner sheet metal portion of the vehicle door;

wherein the body portion of the base bracket is partially disposed at an interior portion of the vehicle door between the inner sheet metal portion and the outer sheet metal portion, and wherein the mirror mounting portion extends outboard of the outer sheet metal portion from the body portion;

a mirror head comprising a mirror reflective element, wherein the mirror head is attached at the mirror mounting portion of the base bracket;

wherein the outer sheet metal portion comprises a cutout region, and wherein the body portion of the base bracket partially extends through the cutout region and outboard from the outer sheet metal portion; and wherein the base bracket comprises a tab extending from the body portion of the base bracket, and wherein the tab engages a surface of the outer sheet metal portion at or near the cutout region.

9. The vehicular exterior rearview mirror system of claim 8, wherein the tab is disposed between and contacts the surface of the outer sheet metal portion and a surface of the inner sheet metal portion.

10. A vehicular exterior rearview mirror system, the vehicular exterior rearview mirror system comprising:

a vehicle door having an inner sheet metal portion and an outer sheet metal portion;

a base bracket comprising (i) a body portion, (ii) a mirror mounting portion that extends from the body portion and (iii) an attaching portion that extends from the body portion;

wherein the attaching portion is attached at the inner sheet metal portion of the vehicle door;

wherein the body portion of the base bracket is partially disposed at an interior portion of the vehicle door between the inner sheet metal portion and the outer sheet metal portion, and wherein the mirror mounting portion extends outboard of the outer sheet metal portion from the body portion;

wherein a cover portion extends from the outer sheet metal portion and at least partially along the mirror mounting portion of the base bracket;

a mirror head comprising a mirror reflective element, wherein the mirror head is attached at the mirror mounting portion of the base bracket;

a powerfold actuator that is operable to pivot the mirror head relative to the mirror mounting portion of the base bracket;

wherein the outer sheet metal portion comprises a cutout region, and wherein the mirror mounting portion of the base bracket extends through the cutout region and outboard from the outer sheet metal portion; and wherein the base bracket comprises a tab extending from the body portion of the base bracket, and wherein the tab engages a surface of the outer sheet metal portion at or near the cutout region.

11. The vehicular exterior rearview mirror system of claim 10, wherein the tab is disposed between and contacts the surface of the outer sheet metal portion and a surface of the inner sheet metal portion.

12. A vehicular exterior rearview mirror system, the vehicular exterior rearview mirror system comprising:

a vehicle door having an inner sheet metal portion and an outer sheet metal portion, wherein the vehicle door is configured for mounting at a side of a vehicle equipped with the vehicular exterior rearview mirror system;

a base bracket comprising (i) a body portion, (ii) a mirror mounting portion that extends from the body portion and (iii) an attaching portion that extends from the body portion;

wherein the attaching portion is attached at the inner sheet metal portion of the vehicle door;

wherein the body portion of the base bracket is partially disposed at an interior portion of the vehicle door between the inner sheet metal portion and the outer sheet metal portion;

wherein the outer sheet metal portion comprises a cutout region, and wherein the body portion of the base bracket partially extends through the cutout region and outboard from the outer sheet metal portion, and wherein the mirror mounting portion extends from the body portion and further outboard of the outer sheet metal portion;

a mirror head comprising a mirror reflective element, wherein the mirror head is attached at the mirror mounting portion of the base bracket; and wherein the base bracket comprises a tab extending from the body portion of the base bracket, and wherein the tab engages a surface of the outer sheet metal portion at or near the cutout region.

13. The vehicular exterior rearview mirror system of claim 12, further comprising a powerfold actuator that is operable to pivot the mirror head relative to the mirror mounting portion of the base bracket.

14. The vehicular exterior rearview mirror system of claim 12, wherein the tab is disposed between and contacts the surface of the outer sheet metal portion and a surface of the inner sheet metal portion.

15. The vehicular exterior rearview mirror system of claim 12, wherein a cover portion extends from the outer sheet metal portion and at least partially along the mirror mounting portion of the base bracket.

* * * * *